United States Patent
Shao et al.

(10) Patent No.: US 10,061,123 B2
(45) Date of Patent: Aug. 28, 2018

(54) SURFACTANTS FOR IMPROVING ELECTROPHORETIC MEDIA PERFORMANCE

(71) Applicant: E INK CALIFORNIA, LLC, Fremont, CA (US)

(72) Inventors: Lin Shao, Fremont, CA (US); Haiyan Gu, Fremont, CA (US); Ming Wang, Fremont, CA (US); Vladimir Sofiyev, Oakland, CA (US)

(73) Assignee: E INK CALIFORNIA, LLC, Fremont, CA (US)

( * ) Notice: Subject to any disclaimer, the term of this patent is extended or adjusted under 35 U.S.C. 154(b) by 0 days.

(21) Appl. No.: 15/403,295

(22) Filed: Jan. 11, 2017

(65) Prior Publication Data

US 2017/0205626 A1   Jul. 20, 2017

Related U.S. Application Data

(60) Provisional application No. 62/279,821, filed on Jan. 17, 2016.

(51) Int. Cl.
*G02B 26/00*   (2006.01)
*G02B 27/00*   (2006.01)
*G02F 1/167*   (2006.01)

(52) U.S. Cl.
CPC ......... *G02B 27/0018* (2013.01); *G02F 1/167* (2013.01); *G02F 2001/1672* (2013.01); *G02F 2001/1678* (2013.01)

(58) Field of Classification Search
CPC ............. G02F 1/167; G02F 2001/1678; G02F 2001/1672; G02F 2202/28; G02F 1/133516; G02F 1/136204; G02F 1/133514; G02F 1/136227; G02F 2201/44; G02F 2202/022; G02F 2203/02; G02F 1/0107; G02F 1/1309; G02F 1/13306; G02F 1/13338; G02F 1/133512
USPC ........ 359/237, 265–267, 270–273, 290–292, 359/295, 296, 298, 321, 322, 315
See application file for complete search history.

(56) References Cited

U.S. PATENT DOCUMENTS

| | | |
|---|---|---|
| 2,525,786 A | 10/1950 | Filachione |
| 2,800,457 A | 7/1957 | Barrett et al. |
| 4,001,140 A | 1/1977 | Foris |
| 4,273,672 A | 6/1981 | Vassiliades |
| 4,522,908 A | 6/1985 | De Winter et al. |
| 6,327,072 B1 | 12/2001 | Comiskey |
| 6,672,921 B1 | 1/2004 | Liang |
| 6,788,449 B2 | 9/2004 | Liang |
| 6,866,760 B2 | 3/2005 | Paolini, Jr. |
| 6,930,818 B1 | 8/2005 | Liang |
| 6,982,178 B2 | 1/2006 | LeCain et al. |
| 7,144,942 B2 | 12/2006 | Zang |
| 7,170,670 B2 | 1/2007 | Webber |
| 7,205,355 B2 | 4/2007 | Liang |
| 7,224,511 B2 | 5/2007 | Takagi |
| 7,236,290 B1 * | 6/2007 | Zhang ............... B01D 57/02 204/450 |
| 7,236,291 B2 | 6/2007 | Kaga et al. |
| 7,321,459 B2 | 1/2008 | Masuda et al. |
| 7,339,715 B2 | 3/2008 | Webber et al. |
| 7,405,865 B2 | 7/2008 | Ogiwara |
| 7,411,719 B2 | 8/2008 | Paolini, Jr. et al. |
| 7,715,087 B2 | 5/2010 | Hou |
| 7,736,829 B2 | 6/2010 | Silcoff |
| 8,625,188 B2 | 1/2014 | Wang |
| 8,628,178 B2 | 1/2014 | Shiono |
| 8,717,664 B2 | 5/2014 | Wang |
| 8,902,491 B2 | 12/2014 | Wang |
| 9,039,938 B2 | 5/2015 | Crain |
| 9,052,564 B2 | 6/2015 | Sprague |
| 9,081,250 B2 | 7/2015 | Liang |
| 9,223,164 B2 | 12/2015 | Lai |
| 9,337,737 B2 | 5/2016 | Yang et al. |
| 9,484,123 B2 | 11/2016 | Sharaby |
| 9,512,320 B2 | 12/2016 | Denda et al. |
| 2008/0020007 A1 | 1/2008 | Zang |
| 2010/0290103 A1 | 11/2010 | Fontana |
| 2012/0118198 A1 | 5/2012 | Zhou |
| 2014/0364548 A1 | 12/2014 | Everhardus |
| 2015/0005720 A1 | 1/2015 | Zang |
| 2015/0206478 A1 * | 7/2015 | Yamazaki ............ G09G 3/344 345/206 |
| 2015/0213765 A1 | 7/2015 | Gates |
| 2015/0378235 A1 | 12/2015 | Lin |
| 2016/0109780 A1 | 4/2016 | Liu |

FOREIGN PATENT DOCUMENTS

JP   2006313334   11/2006

OTHER PUBLICATIONS

Korean Intellectual Property Office; PCT/US2017/012951; International Search Report and Written Opinion; dated Apr. 19, 2017. Apr. 19, 2017.
Korean Intellectual Property Office; PCT/US2017/012911; International Search Report and Written Opinion; dated Apr. 27, 2017. Apr. 27, 2017.
Korean Intellectual Property Office; PCT/US2017/012926; International Search Report and Written Opinion; dated May 1, 2017. May 1, 2017.
Kitamura, T. et al., "Electrical toner movement for electronic paper-like display", Asia Display/IDW '01, p. 1517, Paper HCS1-1 (2001) Jan. 1, 2001.

(Continued)

*Primary Examiner* — Brandi Thomas
(74) *Attorney, Agent, or Firm* — Brian D. Bean

(57) ABSTRACT

Methods for improving the performance of electrophoretic media with the addition of acetylene surfactants comprising hydroxyl groups. In particular, the described acetylene surfactants reduce ghosting while improving the contrast ratio in electrophoretic displays.

14 Claims, No Drawings

(56) References Cited

OTHER PUBLICATIONS

Yamaguchi, Y. et al., "Toner display using insulative particles charged triboelectrically", Asia Display/IDW '01, p. 1729, Paper AMD4-4 (2001) Jan. 1, 2001.

* cited by examiner

SURFACTANTS FOR IMPROVING ELECTROPHORETIC MEDIA PERFORMANCE

RELATED APPLICATIONS

This application claims priority to U.S. provisional application No. 62/279,821, filed Jan. 17, 2016, which is incorporated herein by reference in its entirety.

BACKGROUND OF INVENTION

This invention relates to electrophoretic displays and surfactants that interact with pigments included in electrophoretic media to improve the performance of the media when the media are used in a display. For example, the disclosed surfactants can be added to an electrophoretic medium to improve the brightness of the colored (white) state, the contrast between light (on) and dark (off) states, and the speed of switching between light and dark states for a variety of pigments. The surfactants also diminish images that remain after a display has been switched between two images, a phenomenon known as "ghosting." The surfactants additionally diminish the amount of unintended switching in the electrophoretic medium in proximity to a pixel, a phenomenon known as "blooming."

Particle-based electrophoretic displays have been the subject of intense research and development for a number of years. In such displays, a plurality of charged particles (sometimes referred to as pigment particles) move through a fluid under the influence of an electric field. The electric field is typically provided by a conductive film or a transistor, such as a field-effect transistor. Electrophoretic displays have good brightness and contrast, wide viewing angles, state bistability, and low power consumption when compared with liquid crystal displays. Such electrophoretic displays have slower switching speeds than LCD displays, however, and electrophoretic displays are typically too slow to display real-time video. Additionally, the electrophoretic displays can be sluggish at low temperatures because the viscosity of the fluid limits the movement of the electrophoretic particles. Despite these shortcomings, electrophoretic displays can be found in everyday products such as electronic books (e-readers), mobile phones and mobile phone covers, smart cards, signs, watches, shelf labels, and flash drives.

An electrophoretic image display (EPID) typically comprises a pair of spaced-apart plate-like electrodes. At least one of the electrode plates, typically on the viewing side, is transparent. An electrophoretic fluid composed of a dielectric solvent with charged pigment particles dispersed therein is enclosed between the two electrode plates. An electrophoretic fluid may have one type of charged pigment particles dispersed in a solvent or solvent mixture of a contrasting color. In this case, when a voltage difference is imposed between the two electrode plates, the pigment particles migrate by attraction to the plate of polarity opposite that of the pigment particles. Thus, the color showing at the transparent plate can be either the color of the solvent or the color of the pigment particles. Reversal of plate polarity will cause the particles to migrate to the opposite plate, thereby reversing the color. Alternatively, an electrophoretic fluid may have two types of pigment particles of contrasting colors and carrying opposite charges and the two types of pigment particles are dispersed in a clear solvent or solvent mixture. In this case, when a voltage difference is imposed between the two electrode plates, the two types of pigment particles would move to opposite ends (top or bottom) in a display cell. Thus, one of the colors of the two types of the pigment particles would be seen at the viewing side of the display cell.

Many commercial electrophoretic media essentially display only two colors, with a gradient between the black and white extremes, known as "grayscale." Such electrophoretic media either use a single type of electrophoretic particle having a first color in a colored fluid having a second, different color (in which case, the first color is displayed when the particles lie adjacent the viewing surface of the display and the second color is displayed when the particles are spaced from the viewing surface), or first and second types of electrophoretic particles having differing first and second colors in an uncolored fluid. In the latter case, the first color is displayed when the first type of particles lie adjacent the viewing surface of the display and the second color is displayed when the second type of particles lie adjacent the viewing surface). Typically the two colors are black and white.

If a full color display is desired, a color filter array may be deposited over the viewing surface of the monochrome (black and white) display. Displays with color filter arrays rely on area sharing and color blending to create color stimuli. The available display area is shared between three or four primary colors such as red/green/blue (RGB) or red/green/blue/white (RGBW), and the filters can be arranged in one-dimensional (stripe) or two-dimensional (2×2) repeat patterns. Other choices of primary colors or more than three primaries are also known in the art. The three (in the case of RGB displays) or four (in the case of RGBW displays) sub-pixels are chosen small enough so that at the intended viewing distance they visually blend together to a single pixel with a uniform color stimulus ('color blending'). The inherent disadvantage of area sharing is that the colorants are always present, and colors can only be modulated by switching the corresponding pixels of the underlying monochrome display to white or black (switching the corresponding primary colors on or off). For example, in an ideal RGBW display, each of the red, green, blue and white primaries occupy one fourth of the display area (one sub-pixel out of four), with the white sub-pixel being as bright as the underlying monochrome display white, and each of the colored sub-pixels being no lighter than one third of the monochrome display white. The brightness of the white color shown by the display as a whole cannot be more than one half of the brightness of the white sub-pixel (white areas of the display are produced by displaying the one white sub-pixel out of each four, plus each colored sub-pixel in its colored form being equivalent to one third of a white sub-pixel, so the three colored sub-pixels combined contribute no more than the one white sub-pixel). The brightness and saturation of colors is lowered by area-sharing with color pixels switched to black. Area sharing is especially problematic when mixing yellow because it is lighter than any other color of equal brightness, and saturated yellow is almost as bright as white. Switching the blue pixels (one fourth of the display area) to black makes the yellow too dark.

Surfactants have been used for some time with electrophoretic media to improve the performance of the media. For example, U.S. Patent Publication No. 2002/0180687 describes the use of polyhydroxy and aminoalcohol surfactants to stabilize charged electrophoretic particles dispersed in a non-polar fluid. In particular, polyhydroxy surfactants were found to reduce particle flocculation and to prevent electrophoretic particles from attaching to the walls of the capsules containing the electrophoretic media. Other references, such as U.S. Pat. No. 7,405,865, suggest that the contrast between light and dark states can be improved with the inclusion of alkyne surfactants including acetylene glycol derivatives. Such surfactants can also improve the durability and shelf-life of electrophoretic media by decreasing the likelihood that the electrophoretic particles will settle out from the fluid of the electrophoretic medium.

Nonetheless, although seemingly simple, electrophoretic media and electrophoretic devices display complex behaviors. For instance, it has been discovered that simple "on/off" voltage pulses are insufficient to achieve high-quality text in electronic readers. Rather, complicated driving schemes (waveforms) are needed to drive the particles between states and to assure that the new displayed images do not retain a memory of the previous image, i.e., a "ghost." See, for example, U.S. Patent Publication No. 20150213765. Compounded with the complexities of the electric fields, the internal phase, i.e., the mixture of particles (pigment) and fluid, can exhibit unexpected behavior due to interactions between charged species and the surrounding environment (such as an encapsulation medium, e.g., a coacervate or polymer microcell) upon the application of an electric field. Additionally, unexpected behaviors may result from impurities in the electrophoretic medium or encapsulation medium. Accordingly, it is difficult to predict how an electrophoretic display will respond to variations in the internal phase composition. In many cases, optimizing image quality is both a function of the size and shape of the waveform, the components of the electrophoretic medium, and the components of the encapsulation medium.

SUMMARY OF INVENTION

The invention includes methods for decreasing the presence of a first image in a second image of an electrophoretic display, i.e., "ghosting" by adding acetylene surfactants comprising hydroxyl groups to the electrophoretic medium. By including the listed surfactants, the ghosting may be decreased by 30% or more, i.e., by 50% or more, i.e., by 80% or more, using the measurement techniques described below.

Typically, the electrophoretic display includes an electrophoretic medium, a light-transmissive electrode, and at least one pixel electrode configured to cause the electrophoretic medium to switch between the first and second images. In some embodiments, the electrophoretic medium comprises a plurality of charged particles dispersed in a non-polar fluid, wherein the charged particles are black, white, red, green, blue, cyan, yellow, or magenta in color. In some instances, the non-polar fluid comprises a mixture of branched hydrocarbons. The electrophoretic medium of the invention may be encapsulated, for example in a microcell or a protein coacervate, as discussed in the Background section. In addition, electrophoretic media of the invention can be dispersed in a polymer matrix. The encapsulated or polymer-dispersed electrophoretic media may be incorporated into a front plane laminate (FPL) and/or electro-optic displays as discussed in the Background. Such materials can be used to create electrophoretic image displays (EPID), signs, or architectural materials that will change appearance upon receipt of a signal.

In some embodiments, the acetylene surfactants comprise Formula I:

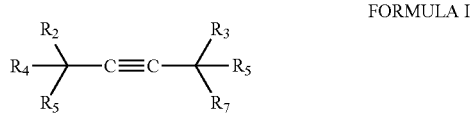

FORMULA I wherein $R_2$, $R_3$, $R_4$, $R_5$, $R_6$, and $R_7$ are independently H, $C_1$-$C_{36}$ branched or unbranched, saturated or unsaturated, alkyl, —OH, —(OCH$_2$)$_m$OH, —(OCH$_2$CH$_2$)$_n$OH, or —(OCH$_2$CHCH$_3$)$_p$OH, wherein m, n, and p are integers from 1 to 30, and wherein at least two of $R_2$, $R_3$, $R_4$, $R_5$, $R_6$, and $R_7$ terminate in —OH. In some embodiments, $R_2$ and $R_3$ are —CH$_3$, and $R_4$ and $R_5$ are independently H, or a $C_1$-$C_{36}$ branched or unbranched, saturated or unsaturated, alkyl. Specifically, $R_6$ and $R_7$ may be —OH, —OCH$_2$OH, or —(OCH$_2$CHCH$_3$)$_2$OH, and $R_4$ and $R_5$ may be —CH$_2$CH(CH$_3$)$_2$, or —CH$_2$CH$_2$CH(CH$_3$)$_2$. In some instances the specific $R_6$ and $R_7$ moieties listed are combined with the specific $R_4$ and $R_5$ moieties listed.

In some embodiments, the acetylene surfactants comprise Formula II:

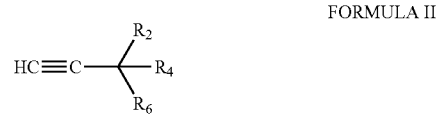

FORMULA II wherein $R_2$, $R_4$, and $R_6$ are independently H, $C_1$-$C_{36}$ branched or unbranched, saturated or unsaturated, alkyl, —OH, —(OCH$_2$)$_m$OH, —(OCH$_2$CH$_2$)$_n$OH, or —(OCH$_2$CHCH$_3$)$_p$OH, wherein m, n, and p are integers from 1 to 30, and wherein at least one of $R_2$, $R_4$, and $R_6$ terminate in —OH. In some embodiments, $R_2$ is —CH$_3$, and $R_4$ is a $C_1$-$C_{36}$ branched or unbranched, saturated or unsaturated, alkyl. Specifically, $R_6$ may be —OH, —OCH$_2$OH, or —(OCH$_2$CHCH$_3$)$_2$OH, and $R_4$ may be —CH$_2$CH(CH$_3$)$_2$, —CH$_2$CH$_2$CH(CH$_3$)$_2$. In some instances the specific $R_6$ moieties listed are combined with the specific $R_4$ moieties.

In some embodiments, between 1:4000 and 1:4 (wt/wt) of surfactant to electrophoretic particle is added to the electrophoretic medium. In other embodiments, between 1:500 and 1:100 (wt/wt) of surfactant to electrophoretic particle is added to the electrophoretic medium.

DETAILED DESCRIPTION

The performance of various types of electrophoretic media can be improved by including the surfactants described herein. For example, additives of the invention can improve the contrast between light (on) and dark (off) states for a variety of pigments used in electrophoretic displays. Additionally, the additives decrease the incidence and intensity of leftover images after a display has been switched between images, a phenomenon known as "ghosting."

In general, the invention involves adding acetylene surfactants comprising hydroxyl groups to electrophoretic media to improve performance. The acetylene surfactants can be, for example, of Formula I and Formula II, described above in the Summary. While it is possible to synthesize acetylene surfactants of Formula I and II, many of them are available as commercial formulations that may include only the acetylene surfactants, the acetylene surfactants along with other additives, or even combinations of acetylene surfactants comprising hydroxyl groups. For example, several members of the SURFYNOL family of surfactants, available from Air Products (Allentown, Pa.), are polyhydroxylated acetylene derivatives. Specifically, 2,4,7,9-tetramethyldecyn-4,7-diol (SURFYNOL 104; also "TDD"), 3,5-dimethyl-1-hexyn-3-ol (SURFYNOL 61), 1,4-dimethyl-1,4-bis(2-methylpropyl)-2-butyne-1,4-diyl ether (SURFYNOL 2502) are suitable for use in the methods of the invention.

The methods of the invention are not limited to the above surfactants, however, as other commercially-available polyhydroxylated acetylene derivatives are also suitable. For example, commercial formulations such as SURFYNOL 104, SURFYNOL 104A, SURFYNOL 104E, SURFYNOL 104DPM, SURFYNOL 104H, SURFYNOL 104BC, SURFYNOL 104PA, SURFYNOL 104PG-50, SURFYNOL 104S, SURFYNOL 420, SURFYNOL 440, SURFYNOL SE-F, SURFYNOL 61, SURFYNOL PC, SURFYNOL 82, SURFYNOL MD-610S, SURFYNOL MD-20 and SURFYNOL DF-110D may be used in the methods of the invention. In other embodiments, proprietary polyhydroxylated acetylene derivatives known as CARBOWET (Air Products) can be used with the methods of the invention. These include CARBOWET GA-210, 76, CARBOWET GA-221, CARBOWET GA-211, CARBOWET GA-100, and CARBOWET 106. Other suitable polyhydroxylated acetylene surfactants include DYNOL surfactants (Air Products) such as DYNOL 360 (2,5,8,11 tetramethyl 6 dodecyn-5,8 diol ethoxylate), DYNOL 604 (2,5,8,11 tetramethyl 6 dodecyn-5,8 diol ethoxylate) and DYNOL 607 (2,5,8,11 tetramethyl 6 dodecyn-5,8 diol ethoxylate).

In addition to the polyhydroxylated acetylene derivatives above, electrophoretic media may also include other polyhydroxyl surfactant families, such as SPANS (sorbitan derivatives), available from Sigma-Aldrich, including SPAN 20, SPAN 60, SPAN 80, SPAN 83, SPAN 85, and SPAN 120 and TWEENS (polyethylene glycol sorbitan derivatives), also available from Sigma-Aldrich.

The polyhydroxylated acetylene surfactants may be added to an electrophoretic medium at a concentration of greater than 1 g of additive for every 2.5 kg of charged particles, e.g., first charged particles. For example, the polyhydroxylated acetylene surfactant to charged particle ratio may be 1:2500 (wt/wt), e.g., 1:2000 (wt/wt), e.g., 1:1500 (wt/wt), e.g., 1:1000 (wt/wt), e.g., 1:500 (wt/wt), e.g., 1:250 (wt/wt), e.g., 1:200 (wt/wt), e.g., 1:150 (wt/wt), e.g., 1:100 (wt/wt), e.g., 1:50 (wt/wt), e.g., 1:25 (wt/wt), e.g., 1:10 (wt/wt), e.g., 1:5 (wt/wt). For example, the polyhydroxylated acetylene surfactants may be present at a ratio of 1:2000 (wt/wt) to 1:5 (wt/wt) with respect to the first charged particles. The polyhydroxylated acetylene surfactants may have an average molecular weight of greater than 100 grams/mole, e.g., greater than 400 grams/mole, e.g., greater than 500 grams/mole, e.g., greater than 1,000 grams/mole, e.g., greater than 2,000 grams/mole, e.g., greater than 5,000 grams/mole, e.g., greater than 10,000 grams/mole, e.g., greater than 15,000 grams/mole, e.g., greater than 10,000 grams/mole, e.g., greater than 20,000 grams/mole.

In the methods of the invention, polyhydroxylated acetylene surfactants can be used with electrophoretic media that include functionalized pigments in an organic solvent. The media may be incorporated into displays, or into front plane laminates or inverted front plane laminates that are coupled to a backplane to make a display. Electrophoretic media of the invention, i.e., including additives of the invention, may include only black and white pigments, i.e., for use in black/white displays. Electrophoretic media of the invention may also be used in colors displays, i.e., including, for example, three, four, five, six, seven, or eight different types of particles. For examples, a display may be constructed where the particles include black, white, and red or black, white, and yellow. Alternatively, the display may include red, green, and blue particles, or cyan, magenta, and yellow particles, or red, green, blue, and yellow particles, or red, green, blue, white, and black particles, or cyan, yellow, magenta, green, white, and black particles.

The term gray state is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate gray state would actually be pale blue. Indeed, as already mentioned, the change in optical state may not be a color change at all. The terms black and white may be used hereinafter to refer to the two extreme optical states of a display, and should be understood as normally including extreme optical states which are not strictly black and white, for example the aforementioned white and dark blue states.

The terms bistable and bistability are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called multi-stable rather than bistable, although for convenience the term bistable may be used herein to cover both bistable and multi-stable displays.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, U.S. Pat. No. 6,866,760. Accordingly, for purposes of the present application, such polymer-dispersed electrophoretic media are regarded as sub-species of encapsulated electrophoretic media.

A related type of electrophoretic display is a so-called microcell electrophoretic display. In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

As noted above, electrophoretic media require the presence of a fluid. In most prior art electrophoretic media, this fluid is a liquid, but electrophoretic media can be produced using gaseous fluids; see, for example, Kitamura, T., et al., Electrical toner movement for electronic paper-like display, IDW Japan, 2001, Paper HCS1-1, and Yamaguchi, Y., et al., Toner display using insulative particles charged triboelectrically, IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word printing is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

The aforementioned U.S. Pat. No. 6,982,178 describes a method of assembling electrophoretic displays (including an encapsulated electrophoretic display). Essentially, this patent describes a so-called front plane laminate (FPL) which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term light-transmissive is used in this patent and herein to mean that the layer thus designated transmits sufficient light to enable an observer, looking through that layer, to observe the change in display states of the electro-optic medium, which will normally be viewed through the electrically-conductive layer and adjacent substrate (if present); in cases where the electro-optic medium displays a change in reflectivity at non-visible wavelengths, the term light-transmissive should of course be interpreted to refer to transmission of the relevant non-visible wavelengths. The substrate will typically be a polymeric film, and will normally have a thickness in the range of about 1 to about 25 mil (25 to 634 μm), preferably about 2 to about 10 mil (51 to 254 μm). The electrically-conductive layer is conveniently a thin metal or metal oxide layer of, for example, aluminum or indium tin oxide (ITO), or may be a conductive polymer. Poly(ethylene terephthalate) (PET) films coated with aluminum or ITO are available commercially, for example as aluminized Mylar (Mylar is a Registered Trade Mark) from E.I. du Pont de Nemours & Company, Wilmington Del., and such commercial materials may be used with good results in the front plane laminate.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, layer of electro-optic medium and electrically-conductive layer to the backplane. This process is well-adapted to mass production since the front plane laminate may be mass produced, typically using roll-to-roll coating techniques, and then cut into pieces of any size needed for use with specific backplanes.

In addition to the additives of the invention, electrophoretic media may also include charge control agents (CCAs). For example, pigment particles may be functionalized or surface coated with charged or chargeable groups. The CCAs may be absorbed into the particles, they may be covalently bound to the surface of the particles, and they may exist in a charge complex, or be loosely associated via van der Waals forces. Charge control agents often charge the particles by poorly understood and uncontrolled processes, and can lead to undesirably high conductivity of the electrophoretic medium. Also, because the charge control agent is only physically adsorbed on to the particles and is not bound thereto, changes in conditions may cause partial or complete desorption of the charge control agent from the particles, with consequent undesirable changes in the electrophoretic characteristics of the particles. The desorbed charge control agent might resorb on to other surfaces within the electrophoretic medium, and such resorption has the potential for causing additional problems.

Charge control agents comprising a quaternary amine and an unsaturated polymeric tail comprising monomers of at least 10 carbon atoms in length are preferred. Quaternary amines comprise a quaternary ammonium cation $[NR_1R_2R_3R_4]^+$ bonded to an organic molecule, for example an alkyl group or an aryl group. Quaternary amine charge control agents typically include a long non-polar tail attached to the charged ammonium cation, such as the families of fatty acid quaternary amines offered by Akzo Nobel under the tradenames ARQUAD. The quaternary amine charge control agents may be purchased in a purified form, or the charge control agents may be purchased as a reaction product that has formed a quaternary amine charge control agent. For example, SOLSPERSE 17000 (Lubrizol Corporation), may be purchased as a reaction product of 12-hydroxy-octadecanoic acid homopolymer with N,N-dimethyl-1,3-propanediamine and methylbisulfate. Other useful ionic charge control agents include, but are not limited to, sodium dodecylbenzenesulfonate, metal soap, polybutene succinimide, maleic anhydride copolymers, vinylpyridine copolymers, vinylpyrrolidone copolymer, (meth)acrylic acid copolymers or N,N-dimethylaminoethyl(meth)acrylate copolymers), Alcolec LV30 (soy lecithin), Petrostep B100 (petroleum sulfonate) or B70 (barium sulfonate), OLOA 11000 (succinimide ashless dispersant), OLOA 1200 (polyisobutylene succinimides), Unithox 750 (ethoxylates), Petronate L (sodium sulfonate), Disper BYK 101, 2095, 185, 116, 9077 & 220 and ANTITERRA series.

The charge control agents may be added to the electrophoretic medium at a concentration of greater than 1 g of charge control agent for every 100 g of charged particles. For example, the charge control agent to charged particle ratio may be 1:30 (wt/wt), e.g., 1:25 (wt/wt), e.g., 1:20 (wt/wt). The charge control agents may have an average molecular weight of greater than 12,000 grams/mole, e.g., greater than 13,000 grams/mole, e.g., greater than 14,000 grams/mole, e.g., greater than 15,000 grams/mole, e.g., greater than 16,000 grams/mole, e.g., greater than 17,000 grams/mole, e.g., greater than 18,000 grams/mole, e.g., greater than 19,000 grams/mole, e.g., greater than 20,000 grams/mole, e.g., greater than 21,000 grams/mole. For example, the average molecular weight of the charge control agent may be between 14,000 grams/mole and 22,000 grams/mole, e.g., between 15,000 grams/mole and 20,000 grams/mole. In some embodiments, the charge control agents have an average molecular weight of about 19,000 grams/mole.

Additional charge control agents may be used, with or without charged groups in polymer coatings, to provide good electrophoretic mobility to the electrophoretic particles. Stabilizers may be used to prevent agglomeration of the electrophoretic particles, as well as prevent the electrophoretic particles from irreversibly depositing onto the capsule wall. Either component can be constructed from materials across a wide range of molecular weights (low molecular weight, oligomeric, or polymeric), and may be a single pure compound or a mixture. An optional charge control agent or charge director may be used. These constituents typically consist of low molecular weight surfactants, polymeric agents, or blends of one or more components and serve to stabilize or otherwise modify the sign and/or magnitude of the charge on the electrophoretic particles. Additional pigment properties which may be relevant are the particle size distribution, the chemical composition, and the lightfastness.

As already indicated, the suspending fluid containing the particles should be chosen based on properties such as density, refractive index, and solubility. A preferred suspending fluid has a low dielectric constant (about 2), high volume resistivity (about $10^{15}$ ohm-cm), low viscosity (less than 5 centistokes ("cst")), low toxicity and environmental impact, low water solubility (less than 10 parts per million ("ppm")), high specific gravity (greater than 1.5), a high boiling point (greater than 90° C.), and a low refractive index (less than 1.2).

The choice of non-polar fluid may be based on concerns of chemical inertness, density matching to the electrophoretic particle, or chemical compatibility with both the electrophoretic particle and bounding capsule (in the case of encapsulated electrophoretic displays). The viscosity of the fluid should be low when movement of the particles is desired. The refractive index of the suspending fluid may also be substantially matched to that of the particles. As used herein, the refractive index of a suspending fluid "is substantially matched" to that of a particle if the difference between their respective refractive indices is between about zero and about 0.3, and is preferably between about 0.05 and about 0.2.

Non-polar organic solvents, such as halogenated organic solvents, saturated linear or branched hydrocarbons, silicone oils, and low molecular weight halogen-containing polymers are some useful non-polar fluids. The non-polar fluid may comprise a single fluid. The non-polar fluid will, however, often be a blend of more than one fluid in order to tune its chemical and physical properties. Furthermore, the non-polar fluid may contain additional surface modifiers to modify the surface energy or charge of the electrophoretic particle or bounding capsule. Reactants or solvents for the microencapsulation process (oil soluble monomers, for example) can also be contained in the suspending fluid. Additional charge control agents can also be added to the suspending fluid.

Useful organic solvents include, but are not limited to, epoxides, such as decane epoxide and dodecane epoxide; vinyl ethers, such as cyclohexyl vinyl ether and Decave (Registered Trade Mark of International Flavors & Fragrances, Inc., New York, N.Y.); and aromatic hydrocarbons, such as toluene and naphthalene. Useful halogenated organic solvents include, but are not limited to, tetrafluorodibromoethylene, tetrachloroethylene, trifluorochloroethylene, 1,2,4-trichlorobenzene and carbon tetrachloride. These materials have high densities. Useful hydrocarbons include, but are not limited to, dodecane, tetradecane, the aliphatic hydrocarbons in the Isopar (Registered Trade Mark) series (Exxon, Houston, Tex.), Norpar (Registered Trade Mark) (a series of normal paraffinic liquids), Shell-Sol (Registered Trade Mark) (Shell, Houston, Tex.), and Sol-Trol (Registered Trade Mark) (Shell), naphtha, and other petroleum solvents. These materials usually have low densities. Useful examples of silicone oils include, but are not limited to, octamethyl cyclosiloxane and higher molecular weight cyclic siloxanes, poly(methyl phenyl siloxane), hexamethyldisiloxane, and polydimethylsiloxane. These materials usually have low densities. Useful low molecular weight halogen-containing polymers include, but are not limited to, poly(chlorotrifluoroethylene) polymer (Halogenated Hydrocarbon Inc., River Edge, N.J.), Galden (Registered Trade Mark) (a perfluorinated ether from Ausimont, Morristown, N.J.), or Krytox (Registered Trade Mark) from du Pont (Wilmington, Del.). In a preferred embodiment, the suspending fluid is a poly (chlorotrifluoroethylene) polymer. In a particularly preferred embodiment, this polymer has a degree of polymerization from about 2 to about 10. Many of the above materials are available in a range of viscosities, densities, and boiling points.

In some embodiments, the non-polar fluid will include an optically absorbing dye. This dye must be soluble in the fluid, but will generally be insoluble in the other components of the capsule. There is much flexibility in the choice of dye material. The dye can be a pure compound, or blends of dyes to achieve a particular color, including black. The dyes can be fluorescent, which would produce a display in which the fluorescence properties depend on the position of the particles. The dyes can be photoactive, changing to another color or becoming colorless upon irradiation with either visible or ultraviolet light, providing another means for obtaining an optical response. Dyes could also be polymerizable by, for example, thermal, photochemical or chemical diffusion processes, forming a solid absorbing polymer inside the bounding shell.

A number of dyes already known to those skilled in the art of electrophoretic displays will prove useful. Useful azo dyes include, but are not limited to: the Oil Red dyes, and the Sudan Red and Sudan Black series of dyes. Useful anthraquinone dyes include, but are not limited to: the Oil Blue dyes, and the Macrolex Blue series of dyes. Useful triphenylmethane dyes include, but are not limited to, Michler's hydrol, Malachite Green, Crystal Violet, and Auramine O. The core particle may be of an inorganic pigment such as $TiO_2$, $ZrO_2$, ZnO, $Al_2O_3$, CI pigment black 26 or 28 or the like (e.g., manganese ferrite black spinel or copper chromite black spinel), or an organic pigment such as phthalocyanine blue, phthalocyanine green, diarylide yellow, diarylide AAOT yellow, and quinacridone, azo, rhodamine, perylene pigment series from Sun Chemical, Hansa yellow G particles from Kanto Chemical, and Carbon Lampblack from Fisher or the like.

Particle dispersion stabilizers may also be added to prevent particle flocculation or attachment to the capsule walls. For the typical high resistivity liquids used as suspending fluids in electrophoretic displays, non-aqueous surfactants may be used. These include, but are not limited to, glycol ethers, acetylenic glycols, alkanolamides, sorbitol derivatives, alkyl amines, quaternary amines, imidazolines, dialkyl oxides, and sulfosuccinates.

If a bistable electrophoretic medium is desired, it may be desirable to include in the suspending fluid a polymer having a number average molecular weight in excess of about 20,000, this polymer being essentially non-absorbing on the electrophoretic particles; poly(isobutylene) is a preferred polymer for this purpose. See U.S. Pat. No. 7,170,670, the entire disclosure of which is herein incorporated by reference.

Encapsulation of the internal phase may be accomplished in a number of different ways. Numerous suitable procedures for microencapsulation are detailed in both Microencapsulation, Processes and Applications, (I. E. Vandegaer, ed.), Plenum Press, New York, N.Y. (1974) and Gutcho, Microcapsules and Microencapsulation Techniques, Noyes Data Corp., Park Ridge, N.J. (1976). The processes fall into several general categories, all of which can be applied to the present invention: interfacial polymerization, in situ polymerization, physical processes, such as coextrusion and other phase separation processes, in-liquid curing, and simple/complex coacervation.

Numerous materials and processes should prove useful in formulating displays of the present invention. Useful materials for simple coacervation processes to form the capsule include, but are not limited to, gelatin, poly(vinyl alcohol), poly(vinyl acetate), and cellulosic derivatives, such as, for example, carboxymethylcellulose. Useful materials for complex coacervation processes include, but are not limited to, gelatin, acacia, carageenan, carboxymethylcellulose, hydrolyzed styrene anhydride copolymers, agar, alginate, casein, albumin, methyl vinyl ether co-maleic anhydride, and cellulose phthalate. Useful materials for phase separation processes include, but are not limited to, polystyrene, poly (methyl methacrylate) (PMMA), poly(ethyl methacrylate), poly(butyl methacrylate), ethyl cellulose, poly(vinylpyridine), and polyacrylonitrile. Useful materials for in situ polymerization processes include, but are not limited to, polyhydroxyamides, with aldehydes, melamine, or urea and formaldehyde; water-soluble oligomers of the condensate of melamine, or urea and formaldehyde; and vinyl monomers, such as, for example, styrene, methyl methacrylate (MMA) and acrylonitrile Finally, useful materials for interfacial polymerization processes include, but are not limited to, diacyl chlorides, such as, for example, sebacoyl, adipoyl, and di- or poly-amines or alcohols, and isocyanates. Useful emulsion polymerization materials may include, but are not limited to, styrene, vinyl acetate, acrylic acid, butyl acrylate, t-butyl acrylate, methyl methacrylate, and butyl methacrylate.

Capsules produced may be dispersed into a curable carrier, resulting in an ink which may be printed or coated on large and arbitrarily shaped or curved surfaces using conventional printing and coating techniques.

In the context of the present invention, one skilled in the art will select an encapsulation procedure and wall material based on the desired capsule properties. These properties include the distribution of capsule radii; electrical, mechanical, diffusion, and optical properties of the capsule wall; and chemical compatibility with the internal phase of the capsule.

The capsule wall generally has a high electrical resistivity. Although it is possible to use walls with relatively low resistivities, this may limit performance in requiring relatively higher addressing voltages. The capsule wall should also be mechanically strong (although if the finished capsule powder is to be dispersed in a curable polymeric binder for coating, mechanical strength is not as critical). The capsule wall should generally not be porous. If, however, it is desired to use an encapsulation procedure that produces porous capsules, these can be overcoated in a post-processing step (i.e., a second encapsulation). Moreover, if the capsules are to be dispersed in a curable binder, the binder will serve to close the pores. The capsule walls should be optically clear. The wall material may, however, be chosen to match the refractive index of the internal phase of the capsule (i.e., the suspending fluid) or a binder in which the capsules are to be dispersed. For some applications (e.g., interposition between two fixed electrodes), monodispersed capsule radii are desirable.

An encapsulation technique that is suited to the present invention involves a polymerization between urea and formaldehyde in an aqueous phase of an oil/water emulsion in the presence of a negatively charged, carboxyl-substituted, linear hydrocarbon polyelectrolyte material. The resulting capsule wall is a urea/formaldehyde copolymer, which discretely encloses the internal phase. The capsule is clear, mechanically strong, and has good resistivity properties.

The related technique of in situ polymerization utilizes an oil/water emulsion, which is formed by dispersing the electrophoretic fluid (i.e., the dielectric liquid containing a suspension of the pigment particles) in an aqueous environment. The monomers polymerize to form a polymer with higher affinity for the internal phase than for the aqueous phase, thus condensing around the emulsified oily droplets. In one in situ polymerization process, urea and formaldehyde condense in the presence of poly(acrylic acid) (see, e.g., U.S. Pat. No. 4,001,140). In other processes, described in U.S. Pat. No. 4,273,672, any of a variety of cross-linking agents borne in aqueous solution is deposited around microscopic oil droplets. Such cross-linking agents include aldehydes, especially formaldehyde, glyoxal, or glutaraldehyde; alum; zirconium salts; and polyisocyanates.

The coacervation approach also utilizes an oil/water emulsion. One or more colloids are coacervated (i.e., agglomerated) out of the aqueous phase and deposited as shells around the oily droplets through control of temperature, pH and/or relative concentrations, thereby creating the microcapsule. Materials suitable for coacervation include gelatins and gum arabic. See, e.g., U.S. Pat. No. 2,800,457.

The interfacial polymerization approach relies on the presence of an oil-soluble monomer in the electrophoretic composition, which once again is present as an emulsion in an aqueous phase. The monomers in the minute hydrophobic droplets react with a monomer introduced into the aqueous phase, polymerizing at the interface between the droplets and the surrounding aqueous medium and forming shells around the droplets. Although the resulting walls are relatively thin and may be permeable, this process does not require the elevated temperatures characteristic of some other processes, and therefore affords greater flexibility in terms of choosing the dielectric liquid.

Additional materials may be added to encapsulated media to improve the construction of an electrophoretic display. For example, coating aids can be used to improve the uniformity and quality of the coated or printed electrophoretic ink material. Wetting agents may be added to adjust the interfacial tension at the coating/substrate interface and to adjust the liquid/air surface tension. Wetting agents include, but are not limited to, anionic and cationic surfactants, and nonionic species, such as silicone or fluoropolymer-based materials. Dispersing agents may be used to modify the interfacial tension between the capsules and binder, providing control over flocculation and particle settling.

In other embodiments, the electrophoretic medium may be contained in microfabricated cells, i.e., microcells, such as fabricated by E Ink under the tradename MICROCUP. Once the microcells are filled with the electrophoretic medium, the microcells are sealed, an electrode (or an electrode array) is affixed to the microcells, and the filled microcells are driven with electric fields to create a display.

For example, as described in U.S. Pat. No. 6,930,818, a male mold may be used to imprint a conductive substrate, upon which is formed a transparent conductor film. A layer of a thermoplastic or thermoset precursor is then coated on the conductor film. The thermoplastic or thermoset precursor layer is embossed at a temperature higher than the glass transition temperature of the thermoplastic or thermoset precursor layer by the male mold in the form of a roller, plate or belt. Once formed, the mold is released during or after the precursor layer is hardened to reveal an array of microcells. The hardening of the precursor layer may be accomplished by cooling, cross-linking by radiation, heat or moisture. If the curing of the thermoset precursor is accomplished by UV radiation, UV may radiate onto the transparent conductor film from the bottom or the top of the web as shown in the two figures. Alternatively, UV lamps may be placed inside the mold. In this case, the mold must be transparent to allow the UV light to radiate through the pre-patterned male mold on to the thermoset precursor layer.

The thermoplastic or thermoset precursor for the preparation of the microcells may be multifunctional acrylate or methacrylate, vinylether, epoxide and their oligomers, polymers and the like. A crosslinkable oligomer imparting flexibility, such as urethane acrylate or polyester acrylate, is usually also added to improve the flexure resistance of the embossed micro-cups. The composition may contain polymer, oligomer, monomer and additives or only oligomer, monomer and additives.

In general, the microcells can be of any shape, and their sizes and shapes may vary. The microcells may be of substantially uniform size and shape in one system. However, in order to maximize the optical effect, microcells having a mixture of different shapes and sizes may be produced. For example, microcells filled with a dispersion of the red color may have a different shape or size from the green microcells or the blue microcells. Furthermore, a pixel may consist of different numbers of microcells of different colors. For example, a pixel may consist of a number of small green microcells, a number of large red microcells, and a number of small blue microcells. It is not necessary to have the same shape and number for the three colors.

The openings of the microcells may be round, square, rectangular, hexagonal, or any other shape. The partition area between the openings is preferably kept small in order to achieve a high color saturation and contrast while maintaining desirable mechanical properties. Consequently the honeycomb-shaped opening is preferred over, for example, the circular opening.

For reflective electrophoretic displays, the dimension of each individual microcell may be in the range of about $10^2$ to about $5\times10^5$ $\mu m^2$, preferably from about $10^3$ about $5\times10^4$ $\mu m^2$. The depth of the microcells is in the range of about 3 to about 100 microns, preferably from about 10 to about 50 microns. The opening to wall ratio is in the range of from about 0.05 to about 100, preferably from about 0.4 to about 20. The distances of the openings usually are in the range of from about 15 to about 450 microns, preferably from about 25 to about 300 microns from edge to edge of the openings.

Taken together, it will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

EXAMPLES

Example 1

Use of 2,4,7,9-tetramethyldecyn-4,7-diol to Decrease Ghosting.

SURFYNOL 104 (2,4,7,9-tetramethyldecyn-4,7-diol; Air Products), also known as "TDD," was added to a two-electrophoretic particle system of the type described in U.S. Patent Publication Nos. 2013/0077155 and 2013/0250400, both of which are incorporated herein by reference in their entireties. A 1:200 (wt/wt) concentration of TDD to electrophoretic particle was prepared for a test display. The display was driven with a 5 Volt waveform at 20° C. and 0° C., and compared to a control display having no TDD. The displays were evaluated for relative reflectance and color in the light and dark states using an X-rite iOne spectrophotometer with D65 illumination (X-rite, Grand Rapids, Mich.). The data is reported using Both CIExyY and CIELAB color space algorithms. The level of ghosting was determined by driving the display between light and dark images and evaluating the amount of residual reflectance when going from light to dark images, and the amount of reduced reflectance when going from dark to light images. In practice, each display was driven between positive and negative checkerboard patterns while the change in L* was measured at several locations, thereby allowing for the collection of many relevant data points in a short amount of time. The results are shown in Table 1.

TABLE 1

Electrophoretic display performance with 2,4,7,9-tetramethyldecyn-4,7-diol (TDD).

| Material differences | | Control | 1:200 TDD |
|---|---|---|---|
| RT at 5 V | W (Y) | 44.4 | 48.6 |
| | K (Y) | 1.7 | 1.8 |
| | Contrast | 26.1 | 27.0 |
| | White Ghosting (ΔL*) | 1.6 | 0.8 |
| | Black Ghosting (ΔL*) | 0.4 | 0.4 |
| 0 C. Performance at 5 V | W (Y) | 28.9 | 36.5 |
| | K (Y) | 2.6 | 2.0 |
| | Contrast | 11.1 | 18.2 |
| | White Ghosting (ΔL*) | 0.9 | 0.1 |
| | Black Ghosting (ΔL*) | 1.1 | 0.4 |

As can be seen in Table 1, inclusion of TDD decreased the white ghosting in the test panels at room temperature by approximately 50% when added at 1:200 (wt/wt). The TDD also resulted in improved white state reflectivity at all temperatures and driving voltages. While not detailed in Table 1, the edges of the checkerboard pattern were better resolved (crisper) in the sample displays including the TDD.

This observation is the result of reduced blooming (lateral diffusion of images) in the sample displays including TDD.

Example 2

Use of 3,5-dimethyl-1-hexyn-3-ol and 1,4-dimethyl-1,4-bis(2-methylpropyl)-2-butyne-1,4-diyl Ether to Decrease Ghosting.

SURFYNOL 61 (3,5-dimethyl-1-hexyn-3-ol; Air Products) and SURFYNOL 2502 (1,4-dimethyl-1,4-bis(2-methylpropyl)-2-butyne-1,4-diyl ether; Air Products) were added to a two-electrophoretic particle system of the type described in U.S. Patent Publication Nos. 2013/0077155 and 2013/0250400, both of which are incorporated herein by reference in their entireties. The concentration of SURFYNOL 61 was 1:250 (wt/wt) of electrophoretic particles. The concentration of SURFYNOL 2502 was 1:150 (wt/wt) of electrophoretic particles. The prepared displays were then driven with 5 Volt waveforms at 20° C. and 0° C., and compared to a control display as in Example 1. The displays were evaluated for relative reflectance and color in the light and dark states using X-Rite iOne. The results are shown in Table 2.

TABLE 2

Electrophoretic display performance with 3,5-dimethyl-1-hexyn-3-ol (SURFYNOL 61) and 1,4-dimethyl-1,4-bis(2-methylpropyl)-2-butyne-1,4-diyl (SURFYNOL 2502).

| Material differences | | Control | 1:250 SURFYNOL 61 | 1:150 SURFYNOL 2502 |
|---|---|---|---|---|
| RT at 5 V | W (Y) | 46.8 | 48.5 | 49.0 |
| | K (Y) | 1.8 | 1.8 | 1.6 |
| | Contrast | 26.0 | 26.9 | 30.6 |
| | White Ghosting (ΔL*) | 1.3 | 0.8 | 0.8 |
| | Black Ghosting (ΔL*) | 1.2 | 0.7 | 0.6 |
| 0 C. Performance at 5 V | W (Y) | 30.7 | 31.8 | 30.8 |
| | K (Y) | 2.4 | 2.1 | 2.1 |
| | Contrast | 12.9 | 15.4 | 15.0 |
| | White Ghosting (ΔL*) | 1.0 | 0.9 | 0.7 |
| | Black Ghosting (ΔL*) | 1.0 | 1.0 | 0.7 |

As can be seen in Table 2, including SURFYNOL 61 and SURFYNOL 2502 decreased the white ghosting in the test panels at room temperature. However, TDD (Table 1) appears to be more effective in reducing ghosting. The SURFYNOL 61 and 2502 also resulted in improved white state reflectivity at room temperatures for all driving voltages.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. A method for decreasing the presence of a first image in a second image of an electrophoretic display, wherein the electrophoretic display includes an electrophoretic medium, a light-transmissive electrode, and at least one pixel electrode configured to cause the electrophoretic medium to switch between the first and second images, the method comprising adding an acetylene surfactant comprising Formula II:

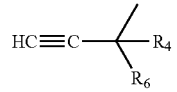

FORMULA II wherein $R_4$ is H, or a $C_1$-$C_{28}$ branched or unbranched, saturated or unsaturated, alkyl, and $R_6$ is —OH, —(OCH$_2$)$_m$OH$_5$, —(OCH$_2$CH$_2$)$_n$OH, or —(OCH$_2$CHCH$_3$)$_p$OH, wherein m, n, and p are independently integers from 1 to 30.

2. The method of claim 1, wherein and $R_6$ is —OH.

3. The method of claim 2, wherein $R_4$ is —CH$_2$CH(CH$_3$)$_2$.

4. The method of claim 1, wherein the electrophoretic medium is encapsulated.

5. The method of claim 4, wherein the electrophoretic medium is encapsulated in a microcell or a protein coacervate.

6. The method of claim 4, wherein the protein coacervate comprises gelatin.

7. The method of claim 1, wherein the electrophoretic medium is dispersed in a polymer.

8. The method of claim 1, wherein the electrophoretic medium comprises charged particles comprising titania, carbon black, or copper chromite.

9. The method of claim 1, wherein greater than 0.01% (wt/wt) of surfactant is added to the electrophoretic medium.

10. The method of claim 9, wherein greater than 0.1% (wt/wt) of surfactant is added to the electrophoretic medium.

11. The method of claim 1, wherein the electrophoretic medium comprises a plurality of charged particles dispersed in a non-polar fluid, wherein the charged particles are black, white red, green, blue, cyan, yellow, or magenta in color.

12. The method of claim 11, wherein the non-polar fluid comprises a mixture of branched hydrocarbons.

13. The method of claim 1, wherein adding the acetylene surfactant decreases the presence of the first image in the second image by 30% or more as compared to an electrophoretic display without the acetylene surfactant.

14. The method of claim 13, wherein adding the acetylene surfactant decreases the presence of the first image in the second image by 50% or more.

* * * * *